C. W. GILBERT.
YARN PRINTING MACHINE.
No. 188,044. Patented March 6, 1877.
2 Sheets—Sheet 1.
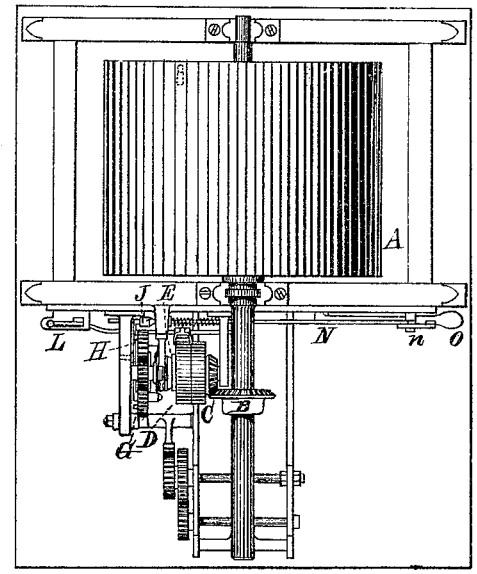
Fig. 1.
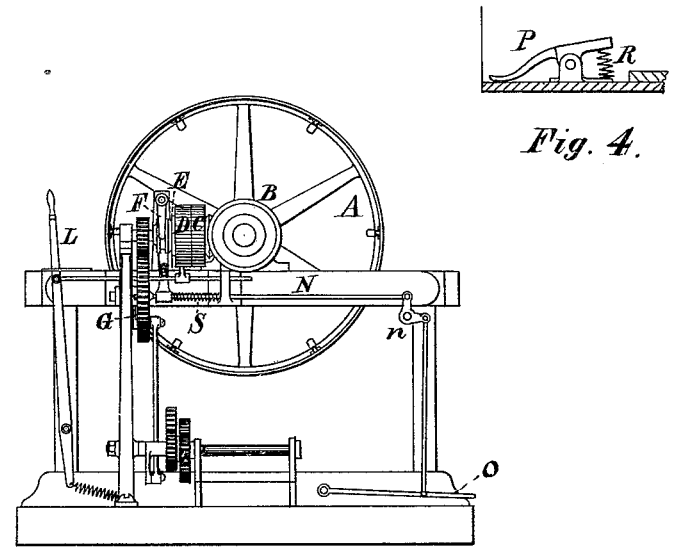
Fig. 4.
Fig. 2.
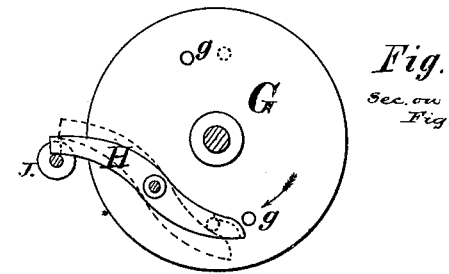
Fig. 3.
Witnesses:
Inventor:
C. W. Gilbert 2 Sheets—Sheet 2.
C. W. GILBERT.
YARN PRINTING MACHINE.
No. 188,044. Patented March 6, 1877.
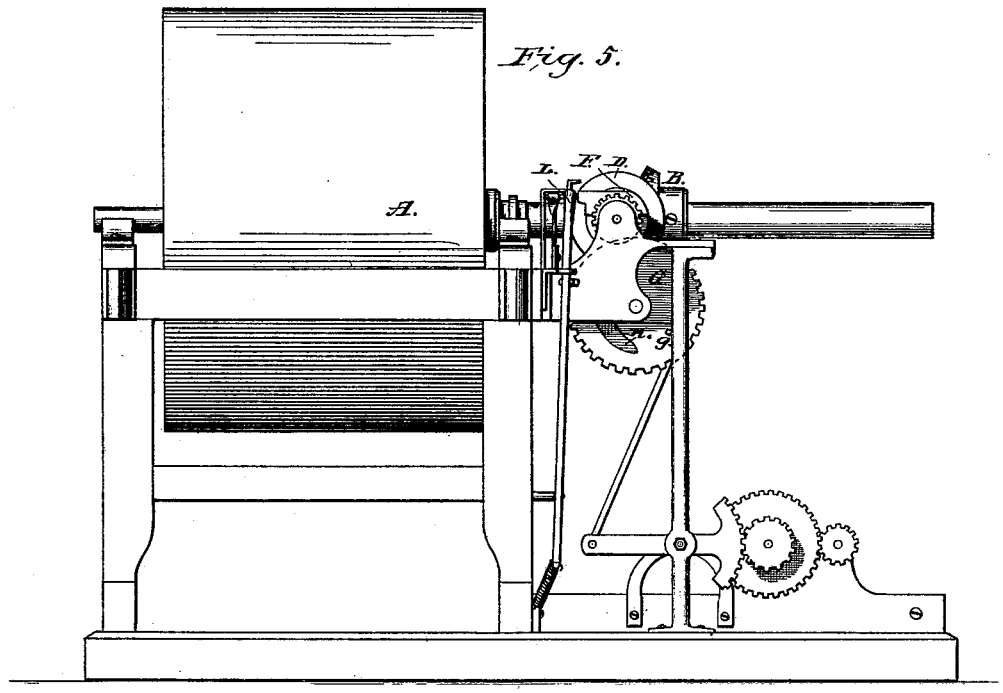
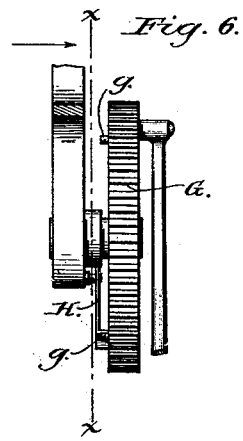
Witnesses.
M. Gardner.
P. B. Graff.
Inventor:
C. W. Gilbert.
by his
Jas. G. Arnold Atty

UNITED STATES PATENT OFFICE.

CHARLES W. GILBERT, OF WORCESTER, MASSACHUSETTS.

IMPROVEMENT IN YARN-PRINTING MACHINES.

Specification forming part of Letters Patent No. 188,044, dated March 6, 1877; application filed November 24, 1875.

*To all whom it may concern:*

Be it known that I, CHARLES W. GILBERT, of the city and county of Worcester, State of Massachusetts, have invented certain Improvements in Yarn-Printing Machines, of which the following is a specification:

My invention relates more particularly to the application of the power to driving the color-carriage, and is designed to drive that by the same belt that drives the yarn-drum, and is so constructed as to start and stop the carriage easily without slopping the color out, and to have the whole within easy control of the operator.

Its nature is shown in the following description of the accompanying drawings, in which—

Figure 1 shows a plan or view, from above, of a drum with driving mechanism embodying my invention. Fig. 2 is an end view of the same. Figs. 3, 4, 5, and 6, same parts hereinafter more particularly described.

The same letters indicate the same parts wherever they occur.

D C are the driving-pulleys, the latter through its pinion, and the gear B, driving the drum A when winding the yarn on the drum, the handle L shipping the belt in the usual way. The pulley D is the ordinary loose pulley, to the side of which I attach a friction-clutch by securing one part to the pulley D, and placing the other on a spline, collar, or shaft connected to a gear meshing into the gear G, so that G may be driven when the clutch E is operated by lever F, which is connected at its lower end with the rod N, on which is a collar, J, and the rod N, through the elbow-lever *n*, and its rod, is connected to the foot-lever O, by which the operator throws the clutch E into action. At H is a stop-lever, pivoted to the frame, as shown in Fig. 6, with one end resting on a collar, J, on the rod N, when the clutch is not in action, and when it is thrown into action the lever H falls behind the collar J, holding the rod N and the clutch in action. The other end of H is arranged so that the pins *g g* in gear G shall, at the proper time, hit it and release the rod N. The wheel G has a connecting-rod to the ordinary arrangement of carriage-driving gear, as shown in Fig. 5, so that when the clutch E is thrown into action, as above, the wheel G, through the connection and gear, drives the carriage across under the drum, when a pin, *g*, in wheel G, hitting the lower end of lever H, as shown in Fig. 3, releases the collar J, allowing the spring S to throw out of action the clutch E, and stop the carriage, the foot-lever O enabling the operator to work quickly, having full liberty of both hands to change color or adjust the drum.

At Fig. 4 is shown a cloth clamp, of which I put a number on the inside of the back end of the drum A, the spring R holding the lever P with sufficient pressure to hold the cloth which is put onto the drum, and its edge turned over the end of the drum and put into the clamps readily and quickly.

I claim—

The stop-lever H, collar J, rod N, spring S, foot-lever O, clutch E, and wheel G, with its studs *g g*, in combination, as and for the purposes above described.

CHAS. W. GILBERT.

Witnesses:
 CHAS. BROWN,
 JAMES GREENE.